United States Patent [19]

Carpinella

[11] Patent Number: 5,765,960
[45] Date of Patent: Jun. 16, 1998

[54] EXPANSION CONNECTOR FOR TUBULAR MEMBER

[75] Inventor: Henry J. Carpinella, Waterbury, Conn.

[73] Assignee: Carpin Manufacturing, Inc., Waterbury, Conn.

[21] Appl. No.: 664,149

[22] Filed: Jun. 14, 1996

[51] Int. Cl.$^6$ ....................................... F16B 9/00
[52] U.S. Cl. ..................... 403/260; 403/258; 403/297
[58] Field of Search ........................ 403/260, 258, 403/256, 297, 230, 252, 247, 254, 255

[56] References Cited

U.S. PATENT DOCUMENTS

| | | | |
|---|---|---|---|
| 3,051,517 | 8/1962 | Yalen | 403/297 |
| 3,787,131 | 1/1974 | Reachek . | |
| 4,190,375 | 2/1980 | Berry | 403/260 X |
| 4,505,609 | 3/1985 | Vella | 403/297 X |
| 4,805,260 | 2/1989 | Tooth . | |
| 4,810,144 | 3/1989 | Martelli | 403/260 X |
| 4,890,954 | 1/1990 | Richards | 403/260 |
| 4,921,370 | 5/1990 | Handler et al. . | |
| 4,997,304 | 3/1991 | Choy | 403/297 X |
| 5,230,581 | 7/1993 | Deng | 403/260 |
| 5,267,806 | 12/1993 | Bock | 403/297 X |

FOREIGN PATENT DOCUMENTS

| | | | |
|---|---|---|---|
| 2 292 145 | 6/1976 | France | 403/297 |
| 663755 | 12/1951 | United Kingdom . | |
| 1232489 | 5/1971 | United Kingdom . | |

*Primary Examiner*—Harry C. Kim
*Assistant Examiner*—William L. Miller
*Attorney, Agent, or Firm*—Alix, Yale & Ristas, LLP

[57] ABSTRACT

A connector comprising a body having a body central bore defining a body axis, one end contoured to conform to a surface of a support member, and another end shaped to coaxially abut a free end of a hollow member. An expansion element is carried by the body for close entry into the hollow member when the body and the free end abut. A drive element passes through the body central bore and has one end adapted to engage the support member, and another end engaging the expansion element, to impart a radially outward force component to the expansion element as at least a portion of the drive element is drawn toward the one end of the body. The expansion element can be in the form of resilient fingers cantilevered from the body into the hollow member, and the drive element can be a wedge member drawn by a bolt, toward the one end of the body, for urging the resilient fingers outwardly. In an alternative configuration, the expansion element can be in the form of a metal clip having a plurality of transversely extending prongs which are preferably arranged such that cantilevered fingers pass between the prongs to maintain the prong orientation relative to the body axis. The drive element can, for example, be in the form of a threaded bolt which threadably engages and draws the clip toward the one end of the body such that the prongs are urged outwardly into engagement with the hollow member.

13 Claims, 4 Drawing Sheets

EXPANSION CONNECTOR FOR TUBULAR MEMBER

BACKGROUND OF THE INVENTION

The present invention relates to securely mounting a laterally projecting member to a support member, particularly tubular members of the type that may be found on the legs and braces of walkers, ladders, and furniture.

Chairs and other furniture for institutional settings, such as cafeterias, classrooms, and the like, must usually meet requirements in which low cost and durability are of paramount importance. Such furniture often is built around a frame consisting of a number of tubular members, some of which define the legs of the furniture. The legs, which may extend nearly vertically downward from the seat, are often braced together with cross-members. In some instances, the diameters of the transversely connected members are different. Of course, such transverse connections can Arise in situations other than the bracing of furniture legs. Further examples include connections for so-called "walkers", and ladders, particularly for boats.

Consistent with the objectives of durability and low cost, the manufacturer of such furniture would find it advantageous to make a secure transverse connection between tubular members of the same or different size, by using connecting means which are simple and inexpensive to fabricate, and which can be installed between the tubular members, in a straightforward, fast, and efficient manner.

SUMMARY OF THE INVENTION

Accordingly, it is an object of the present invention to provide a connector for securely mounting a laterally projecting member to a support member, and in particular for connecting a first substantially tubular member transversely to a second substantially tubular member.

It is a further object to provide a connector for such purpose, which can be fabricated in simple fashion, preferably as a unitary piece.

It is yet a further object that such connector be rapidly installed, so that on a production line, for example, the connections can be rapidly made by inexperienced workers who do not require significant training or possess extraordinary dexterity.

These and other objects and advantages of the invention are achieved in a broad fashion, by a connector comprising a body having a body central bore defining a body axis, with one end contoured to conform to the surface of the support member, and another end shape to coaxially abut the free end of the hollow member. Expansion means are carried by the body for close entry into the hollow member when the body and the free end abut. Drive means pass through the body central bore and have one end adapted to engage the support member, and another end engaging the expansion means, to impart a radially outward force component to the expansion means as the drive means is drawn toward the support member.

The expansion means can be in the form of resilient fingers cantilevered from the body into the hollow member, and the drive means can be a wedge member drawn by a bolt, toward the support member, for urging the resilient fingers outwardly. In an alternative configuration, the expansion means can be in the form of a metal clip having a plurality of transversely extending prongs, which are preferably arranged such that the cantilevered fingers pass between the prongs to maintain the prong orientation relative to the body axis. The drive means can, for example, be in the form of a threaded bolt which threadably engages and draws the clip toward the support member such that the prongs are urged outwardly into engagement with the hollow member. The clip can merely have a smooth through-bore with a nut on the clip retained in position by the fingers, whereby turning the bolt draws the nut toward the support member, thereby expanding the prongs radially.

The connector can also be characterized comprising a body portion adapted for mounting on the support member, an expansion member preferably in the form of a plurality of elongated locking fingers secured to the body portion and projecting outwardly therefrom, with each of the fingers having a camming surface. A cam follower is movable along the camming surfaces in a first direction to drive the fingers toward a locking position in engagement with the projecting member. Drive means are operatively associated with the cam follower for moving the follower along the cam surfaces, whereby the drive means are effective to secure the body portion to the support member.

More particularly, the invention may be understood as including a connector for bolting a first substantially tubular member transversely to a second substantially tubular member, comprising a body having an arcuate portion sized to engage the exterior of the second tubular member transversely, and a cylindrical portion sized to engage the first tubular member substantially coaxially. An expansion member is situated within and coaxially projects from the cylindrical portion of the body. The expansion member includes a plurality of distinct finger members arranged substantially cylindrically for entry into the first tubular member when the first tubular member engages the cylindrical portion of the body. The fingers define a coaxial central channel having channel walls which act as camming surfaces. A cam follower, in the form of a threaded nut or the like, is situated within the channel and substantially conforms to the channel walls. Drive means, in the form of a bolt or screw, is sized to engage and pass transversely through the second tubular member and to coaxially pass through the body of the connector, while threadably engaging the nut member. When turned, the bolt draws the nut along the channel walls, expanding the fingers into locking engagement with the first tubular member, and also drawing the first tubular member and the connector, against the second tubular member.

The connector in accordance with one embodiment can be integrally formed as a single piece of plastic. The body of such a unitary plastic connector can be formed with an arcuate profile that readily conforms to the curvature of the exterior of the base, or support tubular member, whereas the projecting fingers can be formed as distinct projections from a common base, each finger having sufficient flexibility to deflect as the nut is drawn through the channel formed by the interior walls of the fingers. The unitary connector thus does not require assembly or adjustment.

Preferably, the nuts have been prefit into the expansion members, for even greater production line efficiency. The expansion member with nut is placed into one open end of the tubular member which is to be connected to the base tubular member. The tubular member with connector, is then positioned so that the arcuate profile of the connector, engages the tubular support member, substantially centered over one of two aligned installation holes on the support member. The worker then inserts a screw through the exposed hole in the support member, through the hole covered by the connector, and through the connector until the nut is contacted, then threadably engaged. Alternatively, the connector is first positioned to fit onto the support member and be engaged by the bolt or screw. The other tubular member is then positioned over the expansion member and pushed into the body of the connector. As the last step in either procedure the worker merely tightens the screw to expand the fingers, which draws all the components tightly together in a strong, durable connection.

In a variation, the unitary connector can be fabricated such that the arcuate profile on the body is asymmetric. When the arcuate profile of this connector body conforms with the exterior surface of the tubular support member, the axis of the connector, through the central bore, will form an acute angle, such as 85°, with the axis of the base tubular member. The use of such offset connectors does not require any different technique for the factory worker, than the use of connectors for an orthogonal connection.

BRIEF DESCRIPTION OF THE DRAWINGS

These and other objects and advantages will become more evident from the following description of the preferred embodiment, made with reference to the accompanying drawing, in which.

DESCRIPTION OF THE PREFERRED EMBODIMENT

Figure 1:
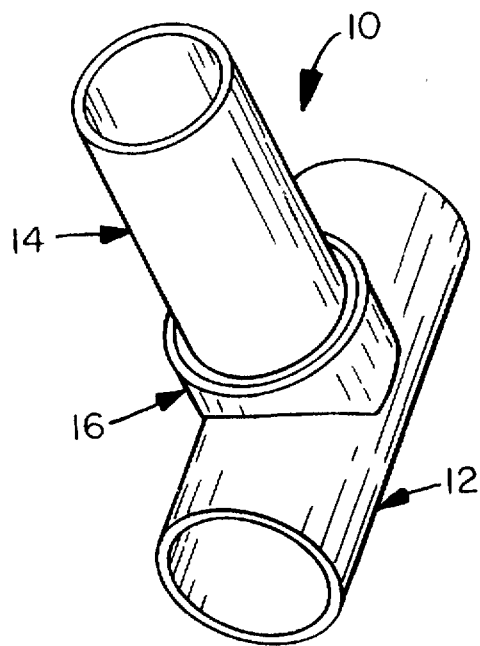
FIG. 1 is a perspective view of the connection between first and second transversely oriented tubular members, using the connector according to the present invention.
Figure 2:
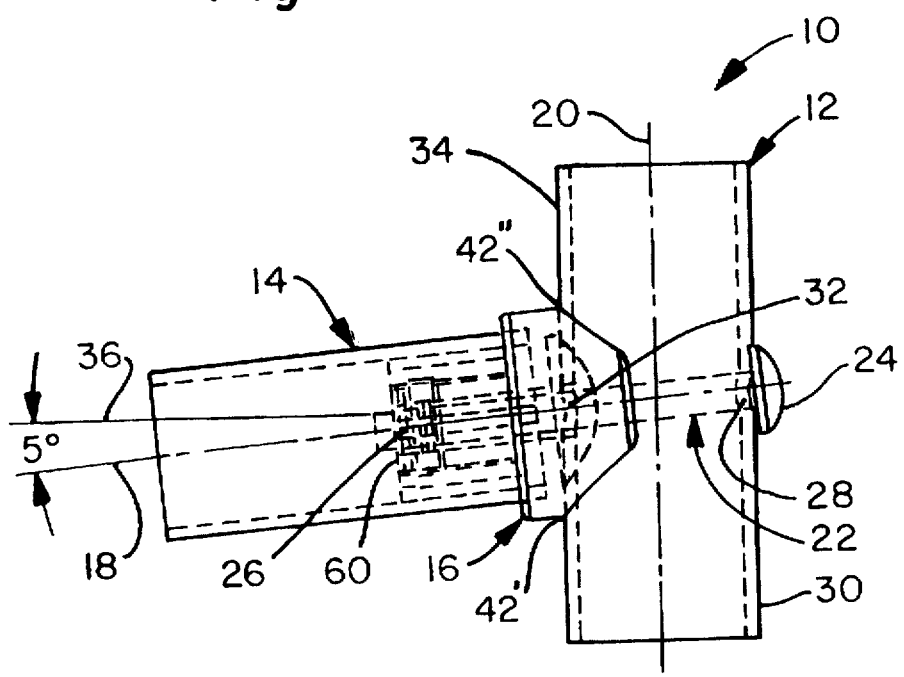
FIG. 2 is a side view of the connection corresponding to FIG. 1.

FIGS. 1 and 2 show a connection 10 between a tubular support member 12 having, for example, a one inch diameter, and another tubular member 14 having, for example, a smaller, e.g., ⅝ths inch diameter, achieved by means of a connector 16 which engages both tubes. Preferably, the axis 18 of the first, or laterally projecting, tube 14, intersects the axis 20 of the second, or support tube 12, so as to form an acute angle of, for example, 85°. As will be described in greater detail below, the connector 16 includes an internal camming surface and an associated cam follower movable along the camming surface, so as to lock the first tube 14 into the connector 16. The drive means for moving the follower along the cam surfaces, also is effective to lock the connector 16 against the second tubular member 12.

In particular, this drive means is preferably in the form of a screw or bolt 22 having a head portion 24 and a threaded portion 26, such that the screw 22 can be passed through hole 28 on the unconnected exterior side 30 of the second tube 12, and through hole 32 on the connected exterior side 34 of the second tube 12, along the axis 18 of the first tubular member 14. One can readily appreciate that the connection shown in FIG. 1, can be made up by passing the screw 22 through holes 28, 32, and connector 16, either before or after connector 16 has been engaged with the first tubular member 14 and the second tubular member 12. As the head 24 on screw 12 is turned, the connector will lock the tubular members together.

In circumstances where it is desired that the first and second tubular members 12, 14 be connected at right angles, the axis 18 of the first tubular member would intersect the axis 20 of the second tubular member, orthogonally. In the illustrated embodiment, however, the axis 18 of the first member 14 is offset by 5° relative to the axis 36 which passes through hole 28 orthogonally to axis 20. The centers of holes 28 and 32 in the second member 12, lie on an extension of the axis 18 of the first tubular member 14.

Figure 3:
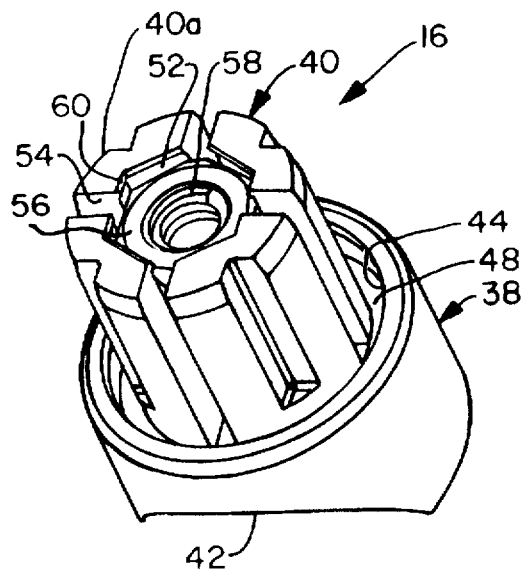
FIG. 3 is a perspective view of the connector in the orientation of FIG. 1, apart from the tubular members.
Figure 4:
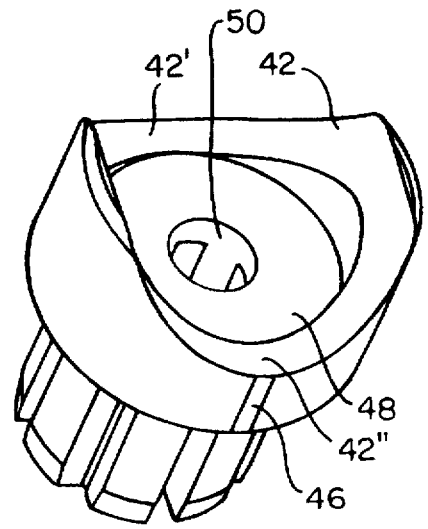
FIG. 4 is a perspective view of the connector of FIG. 3, in a different orientation.
Figure 5:
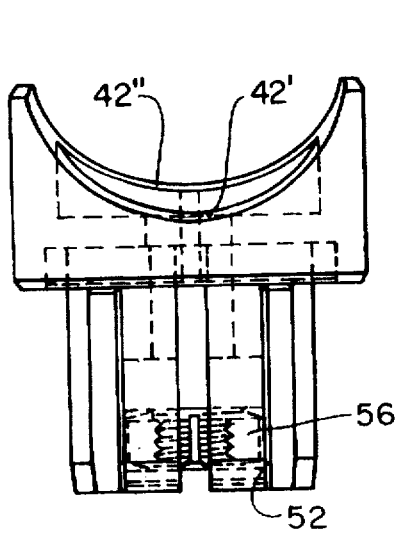
FIG. 5 is an elevation view of the connector shown in FIG. 4.
Figure 6:
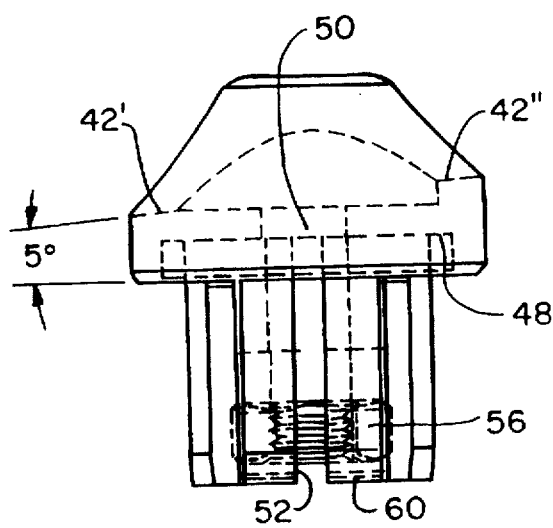
FIG. 6 is a side view of the connector shown in FIG. 5, rotated 90°.

FIGS. 3–6 show the connector 16, apart from the tubular members 12, 14. The perspective view of the connector 16 in FIG. 3 shows the structure that is presented to the first tubular member 14 for engagement therewith, and FIG. 4 shows the connector 16 as presented for engagement with the tubular support member 12.

The connector 16 may be understood as having a body 38 and an expansion member 40 projecting from the body, defining an array of locking fingers, one of which is indicated at 40A. The body has an arcuate profile or portion 42, i.e., somewhat saddle shaped sized to engage the exterior side 34 of the tubular support member 12 transversely, and a cylindrical portion 44, sized to engage the first tubular member 14 substantially coaxially. In the illustrated embodiment, the body portion 38 does not engage the tubular member 12 orthogonally, because the low point 42' of the profile 42, is asymmetric relative to the low point 42", as evident in FIGS. 5 and 6. Point 42" is relatively higher than point 42', and therefore when both points are in contact with the exterior side 34 of the support member 12, the connector 16 will be slightly offset, i.e., preferably about 5°, as shown in FIG. 2. A marker such as protrusion 46 or the like, shown in FIG. 4, may be carried by the body 38 to indicate to the assembler, which of the low points 42',42" is "higher".

A base portion 48 is situated within the connector body 38, and serves as a floor, or stop surface, at the termination of the expansion member 40, within cylindrical portion 44. The base 48 is substantially circular, at least on the side shown in FIG. 3, and defines the structure from which the expansion member 40 projects. A central bore 50 defines the connector axis which, in the assembled condition shown in FIG. 2, is coaxial with the axis 18 of the first, laterally projecting tubular member 14.

The individual fingers such as 40A of the expansion member 40, are distinct from each other, but are preferably all integrally attached to the body at base portion 48. Each finger has an externally chamfered free end and profiled inner wall 52. The inner walls 52 collectively define a channel wall which is coaxial with the central bore 50. The channel walls 52 define cam surfaces which taper toward each other in the direction of base 48. In the illustrated embodiment, the channel cross-section is hexagonal. A cam follower, for example in the form of a nut having an hexagonal perimeter, is situated coaxially in the channel and has internal threads 58 for engaging the threads 26 on screw 22 (see FIG. 2). It can be appreciated that as the screw is tightened, the nut 56 is drawn toward the base portion 48, thereby causing the individual fingers 40A to move radially outwardly relative to each other. This movement is possible because the individual fingers have spaces 54 between them, which contributes to their semi-rigid behavior. The nut 56 will not rotate because the exterior profile matches that of the channel 52, but it will instead be driven as a cam follower on the cam surfaces along the channel walls 52, in response to the driving of the screw.

It can be appreciated that in the neutral condition, the locking finger array constituting the expansion member 40, defines an effective diameter which is substantially equal to the internal diameter of the first tubular member 14. Accordingly, the free end of the tubular member 14 can be slipped over the expansion member 40, into flush contact with the base portion 48. As the nut 56 is driven through channel 52, the nut 56 acts as a wedge to expand the fingers, thereby firmly engaging, and locking them, against the inside of the tubular member 14. The tubular member 14 and connector locked thereto, are together drawn against the exterior connected side 34 of the tubular member 12, as the screw head 24 continues to be turned against the unconnected exterior side 30 of the tubular member 12. The expansion member 40 thus pulls the tube 14 toward tube 12 while also pulling tube 14 tightly against base 48, thereby removing any clearances that might contribute to looseness in the connection. Even in the embodiment illustrated in FIG. 2, where the connection is offset by 5°, the tube 14 sits flush against base portion 48, and the entire arcuate profile 42 sits flush against tubular member 12, thereby contributing to the integrity of the connection.

As a further convenience to rapid assembly, the free ends of each finger 40A can be formed with a tab 60 which projects into channel 52. Once the nut 56 is forced over the tabs 60 into channel 52, the tabs retain the nut within the channel, even against modest force arising from the screw "looking" for the threads during assembly of the connection.

Figure 7:
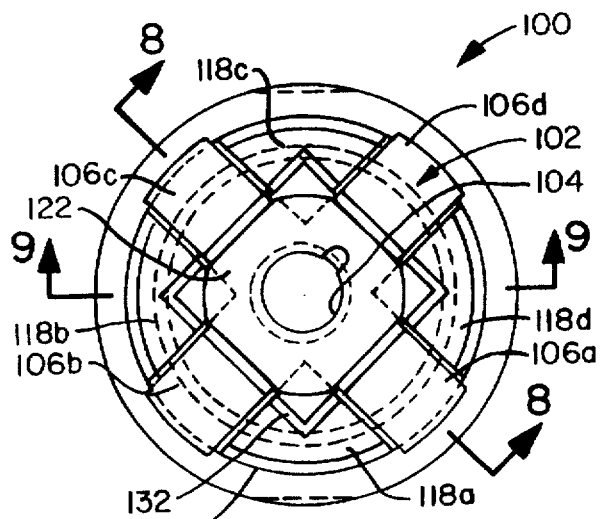
FIGS. 7–9 illustrate a second embodiment, whereby a threaded metal clip having transversely projecting prongs, is engageable by the threaded end of a bolt, for expansion as the bolt is tightened.
Figure 8:
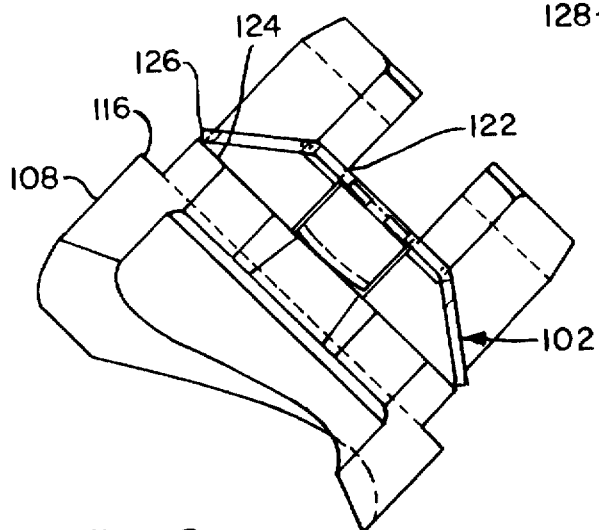
Figure 9:
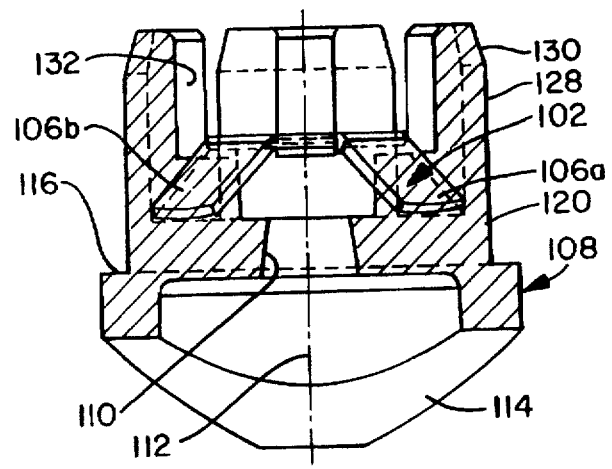

FIGS. 7–9 show a second embodiment 100, in which the expansion means includes a metal clip 102 having a central bore 104 to be penetrated by the actuating bolt, and a plurality of prongs 106a,b,c,d, extending transversely outward. The clip 102 is made of steel with a thread formed to accept the threads on the bolt. The clip is assembled to a plastic insert, i.e., the plastic body 108 which has a central bore 110 defining the body axis 112, one end 114 contoured to conform to the lateral exterior surface of the support member, and another end 116 shaped to coaxially abut the free end of the hollow member. In this embodiment, the other end of the body, forms a ledge to receive the free end of the tube, flush with the outer diameter of the body. The expansion means also includes a plurality of elongated, resilient fingers 118a,b,c,d, cantilevered from the other end 116 of the body, to laterally engage and thereby the maintain the prongs 106 in fixed angular position relative to the body axis 112. The body preferably includes a base 120 from which the fingers 118 are integrally cantilevered, and the base also forms a pedestal 124 for supporting the clip. It should be appreciated that the clip 102 has a substantially ring-like central or interior 122 from which the prongs project obliquely downward, as viewed in FIG. 8. The clip is supported such that as the rotation of the bolt advances the central portion 122 of the clip toward the support member, the prongs spread out to bite into the hollow member, thus creating a very strong hold. The fingers 118 prevent the clip 102 from rotating, during this tightening process.

Preferably, the through bore 110 in the body is tapered toward the clip, to serve as a lead-in for the bolt to assure that the bolt readily engages the threads in the clip. The lead-in portion of the bore in the body is preferably sized such that as the threaded end of the bolt, or screw, enters the bore and turns, it will interfere with the taper and form its own threads in the plastic before entering the clip. This causes the screw connection to remain tight after assembly and during the life of the joint formed by the connector. In another preferable feature, the outer edge 126 of the prongs in the neutral position shown in FIG. 8, extends slightly outside of the pedestal, e.g., approximately 0.015 inch to establish a preload of interference against the hollow member as the member initially seats against the ledge 116. Also, the fingers preferably have an arcuate outer surface 128, which may be chamfered 130, and a recessed or grooved inner surface 132, to maximize the size of the retained clip.

Figure 10:
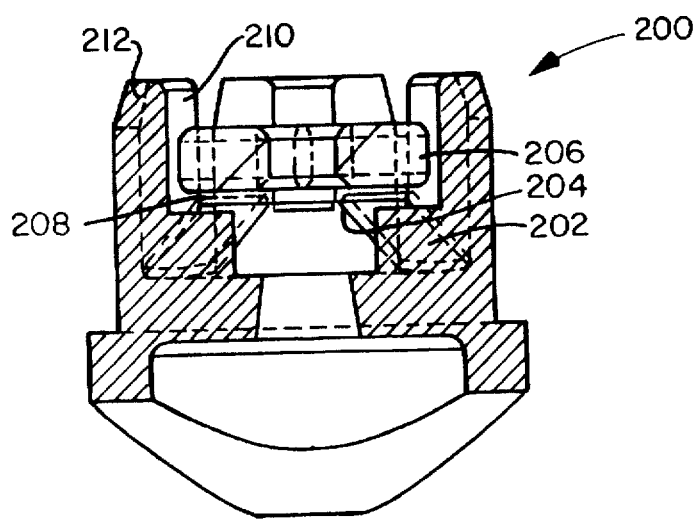
FIG. 10 illustrates a third embodiment, generally similar to that shown in FIGS. 7–9, except that the metal clip having a plurality of transversely extending prongs, is expanded by a nut which engages the threaded end of a bolt.

In a third embodiment 200 shown in FIG. 10, the clip 202 has a smooth, central bore 204, and the drive means further includes a internally threaded nut 206 which rests on the central portion 208 of the clip. The threaded end of the bolt engages the nut and draws the nut downward to urge the prongs outwardly, in a manner analogous to that described with respect to the embodiment of FIGS. 7–9. Although a nut 206 is shown, it should be appreciated that other arrangements are possible, whereby a drive block bears against the clip, for urging the prongs radially outward as the drive block is drawn toward the support member. The grooves 210 of the FIGS. 212 prevent the nut from rotating.

Figure 11:
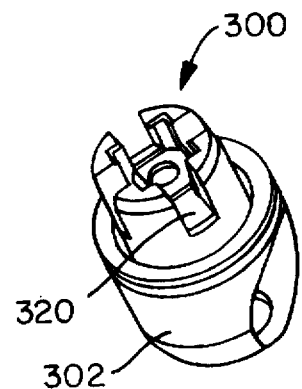
FIGS. 11–13, illustrate a fourth embodiment, wherein the connector has a ring-like end for surrounding the support member.
Figure 13:
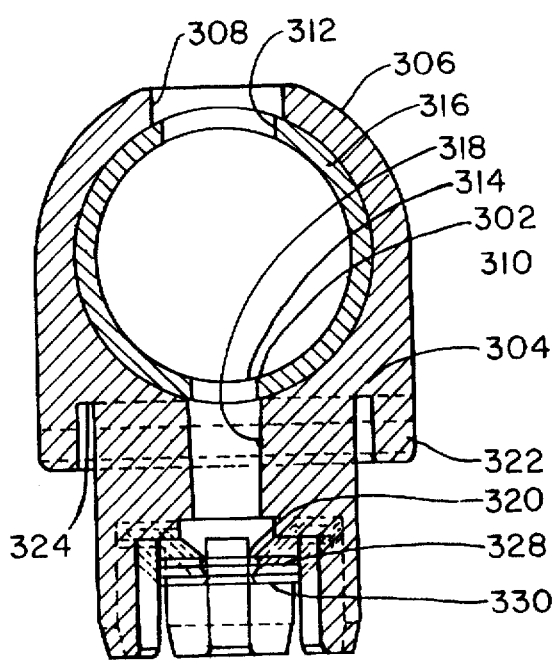
Figure 12:
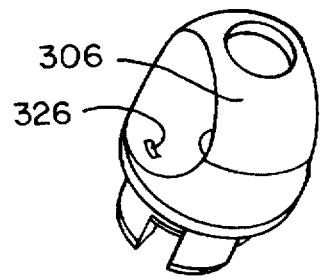

In yet another embodiment 300 illustrated in FIGS. 11–13, the operating principle is similar to the two previously described embodiments, except that the end 302 of the body 304 which is contoured to conform to the exterior surface of the support member, is in the form of a ring 306 sized to coaxially receive the support member. The ring 306 has opposed apertures 308, 310, which register with opposed apertures 312, 314 in the support tube 316, such that a bolt with associated head and/or washer, can be passed through the apertures and the tapered bore 318 in the body, for threaded engagement with either a threaded clip 320, or a threaded drive block on the clip, as shown in the previously described embodiments. The other end 322 of the body 304 forms an annular groove 324 for coaxially engaging the free end of the hollow member.

A further feature shown in FIG. 11, comprise two break through cores 326 to ensure tube-to-tube contact during assembly. This results in a very strong connection that prevents walking or weaping. Also, as shown in FIG. 13, the clip 320 can have a dual set of prongs 328, 330, which increases the holding power of the clip to the hollow member and also increases the holding power of the screw to the clip, due to the additional threads that may be provided in the inner portion of the clip.

The maximum protection against stripping of the threads, is the major advantages of the embodiments in which a nut is employed to draw down against the clip. It can be appreciated that, by selecting one or more of the previously described embodiments, or interchanging the alternative features, any and all types of intersecting tubing of all shapes and sizes, can be joined together. They can be customized to the particular end use and customer preferences. Among the end uses for the invention, include connecting tubular furniture of all types, the assembly of tables which use tubular frames, tables and counters which use tubular frames, ladders, for recreational vehicles and boats, bed frames and headboards, especially as used in the medical industry, medical walkers, bakers' racks and myriad other applications.

What is claimed is:

1. A connector for joining one free end of a hollow member transversely to a lateral exterior surface of a support member, said connector comprising:

a body having a body central bore defining a body axis, one end contoured to conform to the lateral exterior surface of the support member, and another end shaped to coaxially abut the free end of the hollow member;

expansion means carried by said body for close entry into the hollow member when said body and the free end abut, said expansion means including a metal clip having a clip central bore and a plurality of prongs extending transversely outwardly, said expansion means also including a plurality of elongated fingers cantilevered from said another end of said body to laterally engage and thereby maintain said prongs in fixed angular position relative to said body axis; and drive means passing through said body central bore and penetrating said clip central bore, said drive means having one end engaging said expansion means to impart a radially outward force component to said expansion means as said one end of said drive means is drawn toward said one end of said body whereby said clip prongs move radially outwardly into biting contact with the hollow member.

2. The connector of claim 1, wherein said drive means includes a drive block bearing against said clip, for urging said prongs radially outward as said drive block is drawn toward said one end of said body.

3. The connector of claim 1, wherein
said clip central bore is a threaded central bore, and
said drive means includes a bolt having threads engaging said threads in said central bore of said metal clip, for urging said prongs radially outward as said bolt is rotated relative to said metal clip.

4. The connector of claim 1, wherein said body includes a base from which said fingers are integrally cantilevered and which also forms a pedestal for supporting said clip.

5. The connector of claim 1, wherein said prongs of said clip have radially outer ends, and wherein said body includes an annular ledge for receiving the free end of the hollow member, said body further including a pedestal portion on which said prongs of said clip are supported with said radially outer ends of said prongs extending radially outside of said pedestal.

6. The connector of claim 1, wherein said one end of said body has a saddle shaped profile.

7. The connector of claim 6, wherein said profile is asymmetric.

8. The connector of claim 1, wherein said fingers remain radially stationary as said clip prongs move radially outwardly.

9. The connector of claim 1, wherein said clip includes a first concave surface facing said another end of said body when said clip is in a neutral condition and wherein said first surface is deformed to become a more planar surface as said drive means is drawn toward said one end of said body.

10. The connector of claim 1, wherein said clip includes a first concave surface facing said another end of said body when said clip is in a neutral condition, wherein said another end of said body is non-complementary in shape to said first surface of said clip and wherein said another end cooperates with said clip to deform said first surface into a more planar surface as said drive means is drawn toward said one end of said body.

11. The connector of claim 1, wherein said body central bore tapers radially inwardly from said one end of said body toward said another end of said body, and wherein said bore and said drive means are sized to permit an interference fit between said bore and said drive means.

12. The connector of claim 1, wherein said clip is disposed adjacent said another end of said body and wherein said fingers extend axially away from said another end further than said clip whereby said clip is disposed between said fingers.

13. The connector of claim 8, wherein said clip is disposed adjacent said end of said body and wherein said fingers extend axially away from said end further than said clip whereby said clip is disposed between said fingers.

* * * * *

UNITED STATES PATENT AND TRADEMARK OFFICE
CERTIFICATE OF CORRECTION

PATENT NO. : 5,765,960
DATED : June 16, 1998
INVENTOR(S) : Henry J. Carpinella

It is certified that error appears in the above-identified patent and that said Letters Patent is hereby corrected as shown below:

Column 8, line 37, before "end" insert --another--.

Column 8, line 38, before "end" insert --another--.

Signed and Sealed this

Twenty-seventh Day of April, 1999

Attest:

Q. TODD DICKINSON

Attesting Officer

Acting Commissioner of Patents and Trademarks